United States Patent
Ju

(10) Patent No.: US 12,517,742 B2
(45) Date of Patent: Jan. 6, 2026

(54) ENHANCED USER INTERFACE EXPERIENCES GENERATED USING MACHINE LEARNING

(71) Applicant: Netflix, Inc., Los Gatos, CA (US)

(72) Inventor: Cheng Ju, Sunnyvale, CA (US)

(73) Assignee: Netflix, Inc., Los Gatos, CA (US)

( * ) Notice: Subject to any disclaimer, the term of this patent is extended or adjusted under 35 U.S.C. 154(b) by 101 days.

(21) Appl. No.: 18/427,751

(22) Filed: Jan. 30, 2024

(65) Prior Publication Data

US 2024/0311165 A1   Sep. 19, 2024

Related U.S. Application Data

(60) Provisional application No. 63/490,325, filed on Mar. 15, 2023.

(51) Int. Cl.
   *H04N 21/472*   (2011.01)
   *G06F 9/451*   (2018.01)

(52) U.S. Cl.
   CPC .......... *G06F 9/453* (2018.02); *H04N 21/472* (2013.01)

(58) Field of Classification Search
   CPC .............................. G06F 9/453; H04N 21/472
   See application file for complete search history.

(56) References Cited

U.S. PATENT DOCUMENTS

| | | | |
|---|---|---|---|
| 9,519,645 B2 * | 12/2016 | Funk | H04N 21/47208 |
| 11,284,171 B1 * | 3/2022 | Nair | H04N 21/25891 |
| 11,687,802 B2 * | 6/2023 | Subramanya | G10L 15/1815 |
| | | | 704/9 |
| 11,899,706 B2 * | 2/2024 | Lewis | G06F 16/489 |
| 11,917,214 B1 * | 2/2024 | Bell-Geddes | H04N 5/45 |
| 11,956,291 B2 * | 4/2024 | Chaudhri | H04L 65/1069 |
| 11,966,699 B2 * | 4/2024 | Shah | G06F 40/163 |
| 2012/0323938 A1 * | 12/2012 | Skeen | G06F 16/9537 |
| | | | 707/754 |
| 2016/0378747 A1 * | 12/2016 | Orr | G06F 40/30 |
| | | | 704/9 |
| 2023/0116961 A1 * | 4/2023 | Braathen | G06Q 20/384 |
| | | | 705/40 |
| 2023/0377023 A1 * | 11/2023 | Buzzell | G06Q 30/0641 |

* cited by examiner

Primary Examiner — Tadesse Hailu
(74) Attorney, Agent, or Firm — Greenberg Traurig, LLP

(57) ABSTRACT

A computer-implemented method for predicting a user's help intent in relation to a digital streaming system and dynamically customizing a help display based on the predicted help intent. For example, embodiments discussed herein train a help intent machine learning model to generate help intent predictions based on various types of inputs. The embodiments discussed herein further leverage the generated help intent predictions to dynamically update a help display such that when a user lands on that display, predicted solutions that are customized to the user's most likely problem are immediately presented. Various other methods, systems, and computer-readable media are also disclosed.

20 Claims, 10 Drawing Sheets

ENHANCED USER INTERFACE EXPERIENCES GENERATED USING MACHINE LEARNING

CROSS-REFERENCE

This application claims the benefit of U.S. Provisional Application No. 63/490,325, filed Mar. 15, 2023, the disclosure of which is incorporated, in its entirety, by this reference.

BACKGROUND

Digital content streaming is a popular pastime. Digital content streaming has become commonplace in every country and location in the world that has Internet connectivity. As such, digital content streaming platforms typically service a wide range of user needs and expectations. In some instances, digital content streaming platform users experience increasingly complex issues with digital content streaming platforms. In such instances, digital content streaming platform users may engage with the streaming platform's customer service department to seek help. Streaming platform customer service departments are typically reachable via any of a variety of channels. For example, typical customer service channels include text messaging, self-help articles, live phone calls, and so forth.

Due to the complexities associated with digital content streaming, however, providing adequate customer service solutions is often challenging for most digital content streaming platforms. For example, digital content streaming platform resources are depleted as digital content streaming users search through libraries of self-help articles, fruitlessly text with customer service representatives, and wait to speak with live representatives. As such, existing customer service systems are generally inefficient and wasteful while often failing to adequately meet the needs of both digital content streaming platforms and their users.

SUMMARY

As will be described in greater detail below, the present disclosure describes implementations that predict a user's help intent in relation to a digital streaming system and dynamically customize a help display based on the predicted help intent. For example, implementations include receiving a request for rendering instructions for rendering a help display of a digital streaming system on a client device of a digital streaming system user, determining one or more navigation events associated with the digital streaming system over a previous predetermined amount of time, determining additional digital streaming system features associated with the digital streaming system user, applying a help intent machine learning model to the one or more navigation events and the additional digital streaming system features to generate a help intent prediction, replacing at least one portion of the rendering instructions with a portion of alternate rendering instructions based on the help intent prediction, and transmitting the rendering instructions including the portion of alternate rendering instructions to the client device for rendering on the client device.

Some implementations further include receiving the request for rendering instructions via a digital streaming system application installed on the client device. Additionally, in some implementations, the one or more navigation events associated with the digital streaming system include navigation events within the digital streaming system application. Moreover, in some implementations, the previous predetermined amount of time is 24 hours.

In one or more implementations, the additional digital streaming system features associated with the digital streaming system user include account features and streaming features. For example, in one or more implementations, the account features include one or more of: a digital streaming system plan type associated with the digital streaming system user, a digital streaming system account age associated with the digital streaming system user, geographic information for a digital streaming system account associated with the digital streaming system user, or historical information indicated by the digital streaming system account associated with the digital streaming system user. Additionally, in one or more implementations, the streaming features include one or more of: an amount of streaming time associated with a digital streaming system account of the digital streaming system user, a streaming frequency associated with the digital streaming system account of the digital streaming system user, a number of profiles associated with the digital streaming system account of the digital streaming system user, or a streaming history associated with the digital streaming system account of the digital streaming system user.

One or more implementations further include generating rendering instructions for displaying selectable content associated with the help intent prediction. In one or more implementations, replacing the at least one portion of the rendering instructions with the portion of alternate rendering instructions based on the help intent prediction includes replacing the at least one portion of the rendering instructions with the rendering instructions for displaying the selectable content associated with the help intent prediction. Additionally, one or more implementations include applying the help intent machine learning model to the one or more navigation events and the additional digital streaming system features to generate additional help intent predictions, generating additional rendering instructions for displaying selectable content associated with the additional help intent predictions, and replacing additional portions of the rendering instructions with the additional rendering instructions.

Some examples described herein include a system with at least one physical processor and physical memory including computer-executable instructions that, when executed by the at least one physical processor, cause the at least one physical processor to perform various acts. In at least one example, the computer-executable instructions, when executed by the at least one physical processor, cause the at least one physical processor to perform acts including receiving a request for rendering instructions for rendering a help display of a digital streaming system on a client device of a digital streaming system user, determining one or more navigation events associated with the digital streaming system over a previous predetermined amount of time, determining additional digital streaming system features associated with the digital streaming system user, applying a help intent machine learning model to the one or more navigation events and the additional digital streaming system features to generate a help intent prediction, replacing at least one portion of the rendering instructions with a portion of alternate rendering instructions based on the help intent prediction, and transmitting the rendering instructions including the portion of alternate rendering instructions to the client device for rendering on the client device.

In some examples, the above-described method is encoded as computer-readable instructions on a computer-readable medium. In one example, the computer-readable instructions, when executed by at least one processor of a computing device, cause the computing device to receive a request for rendering instructions for rendering a help display of a digital streaming system on a client device of a digital streaming system user, determine one or more navigation events associated with the digital streaming system over a previous predetermined amount of time, determine additional digital streaming system features associated with the digital streaming system user, apply a help intent machine learning model to the one or more navigation events and the additional digital streaming system features to generate a help intent prediction, replace at least one portion of the rendering instructions with a portion of alternate rendering instructions based on the help intent prediction, and transmit the rendering instructions including the portion of alternate rendering instructions to the client device for rendering on the client device.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
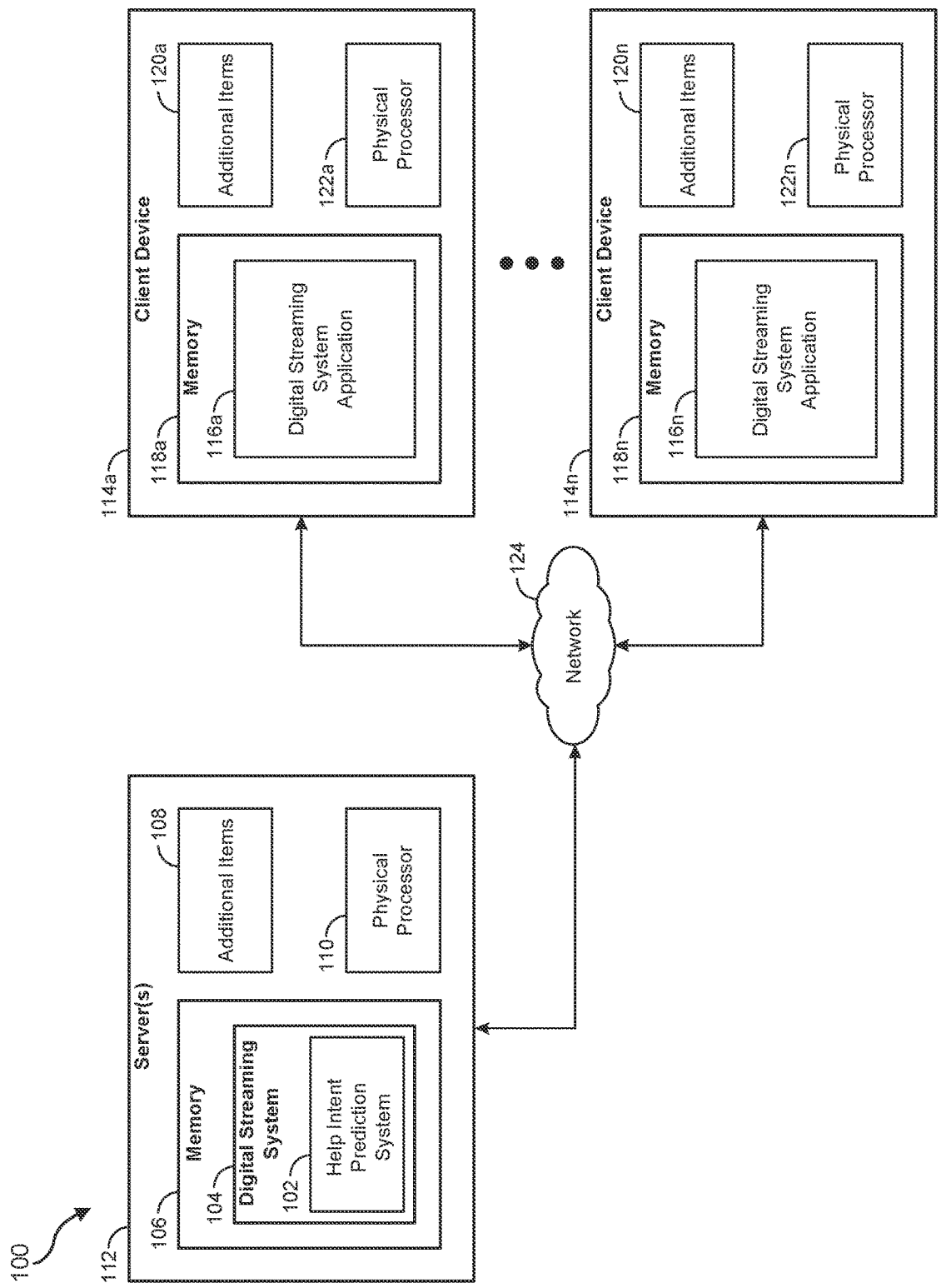
FIG. 1 illustrates an exemplary networking environment for implementing a help intent prediction system in accordance with one or more implementations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As discussed above, typical digital streaming systems provide inefficient and inadequate customer service solutions for streaming users who are experiencing issues within those systems. The present disclosure is generally directed to a system that predicts the type of help a digital streaming system user will need and provides preemptive solutions to that user. As will be explained in greater detail below, embodiments of the present disclosure include a help intent machine learning model that is trained to predict the type of help a specific digital streaming system user will need. Then, when the user navigates to the digital streaming system help page (e.g., via a digital streaming system application or website), embodiments of the present disclosure automatically render help solutions for that user within a customized help page. As such, when the user lands on that page, the first thing the user sees are solutions that are personalized to one or more issues that the user is experiencing in connection with the digital streaming system. Thus, embodiments of the present disclosure provide the user with solutions before the user types a question, configures a search query, or makes a phone call.

In this way, embodiments of the present disclosure provide technical solutions to the technical problems that arise in the face of the efficiencies and inaccuracies that are common to most digital streaming systems. For example, as mentioned above, typical digital streaming systems waste processor cycles, memory resources, display power, and network bandwidth in trying to host self-service help solutions. This is particularly problematic when a user may or may not know how to describe or classify the problem they are experiencing within the digital streaming system. Thus, computing resources are wasted as the user tries various search queries trying to find a helpful article, ties up network bandwidth while trying to adequately describe their problem in a text chat, and then finally gives up and waits in a live call-in queue to speak with a customer service representative. Embodiments of the present disclosure avoid all of this waste and inefficiency by predicting the type of help the user will need based on a variety of specific features and providing the user with a customized help user interface when the user first lands on the help page for the digital streaming system.

Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
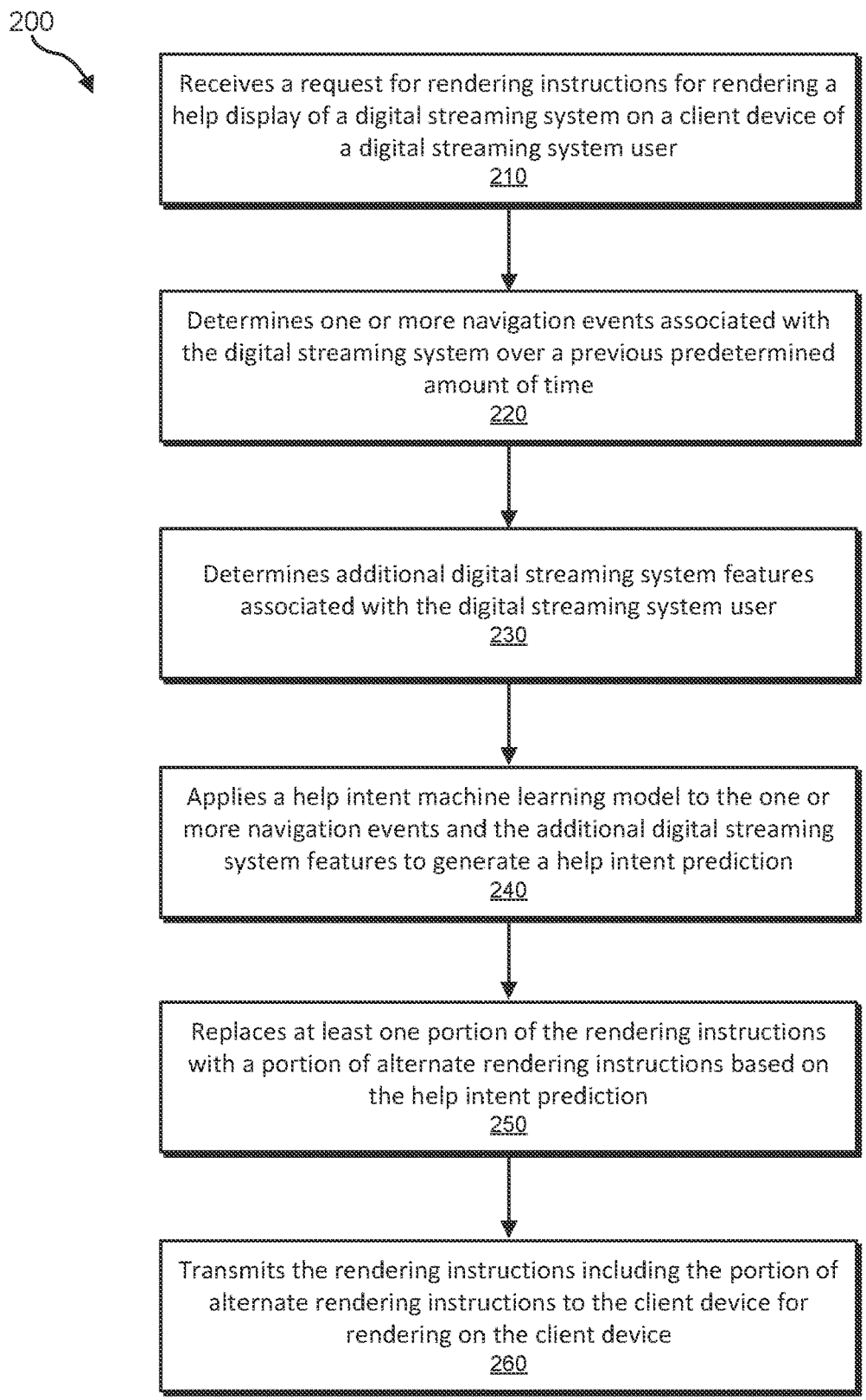
FIG. 2 illustrates a flow diagram of an exemplary computer-implemented method for customizing a digital streaming service help display in accordance with one or more implementations.
Figure 3A:
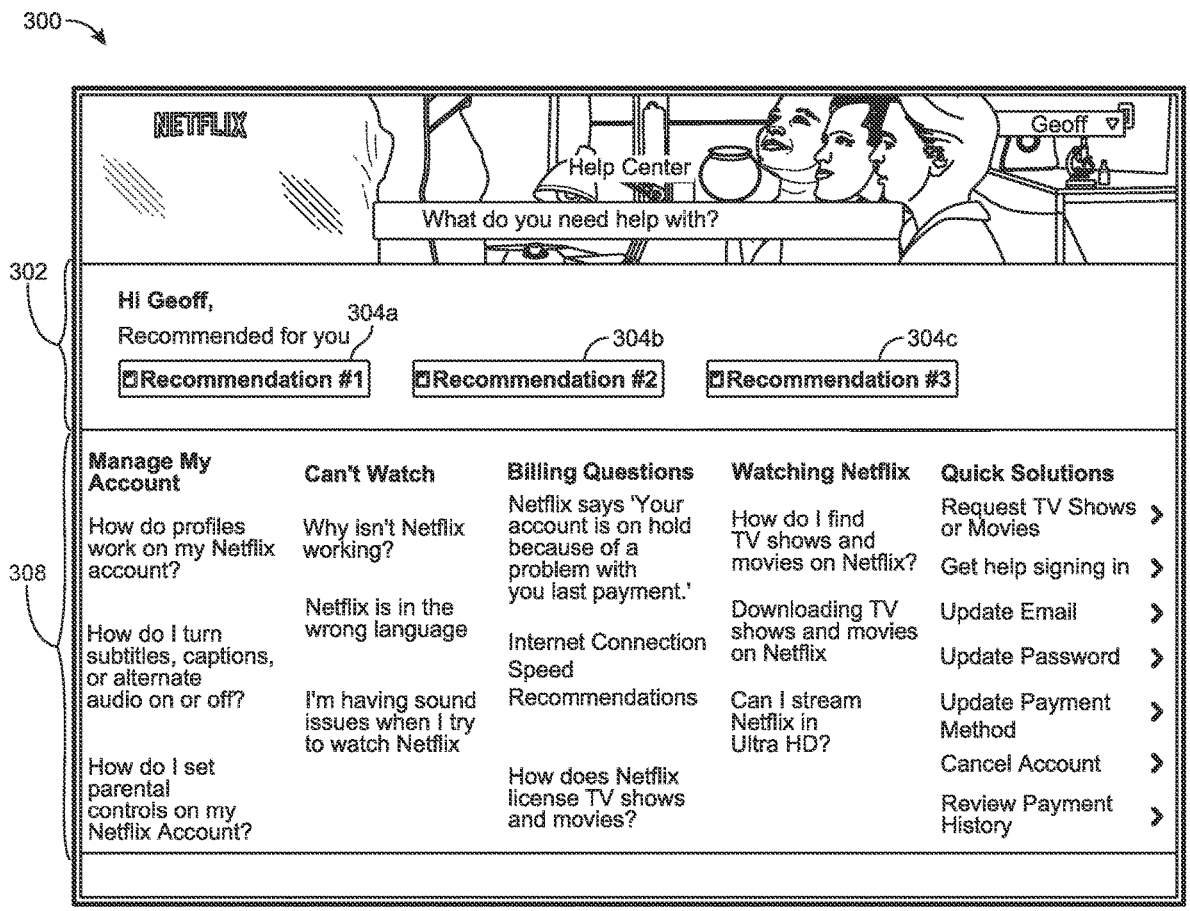
FIGS. 3A and 3B illustrate a help display that has been dynamically updated by the help intent prediction system in accordance with one or more implementations.
Figure 3B:
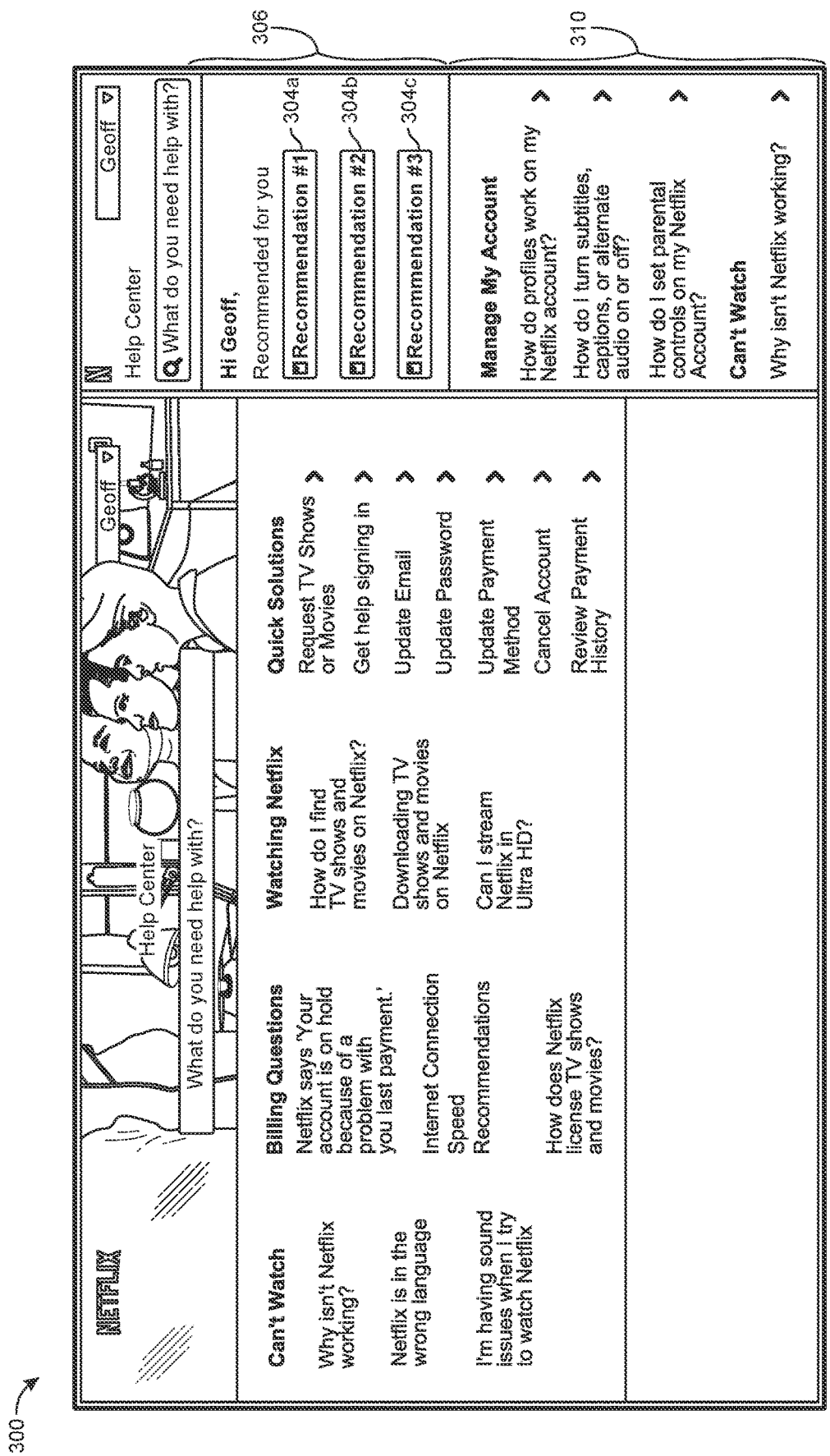
Figure 4:
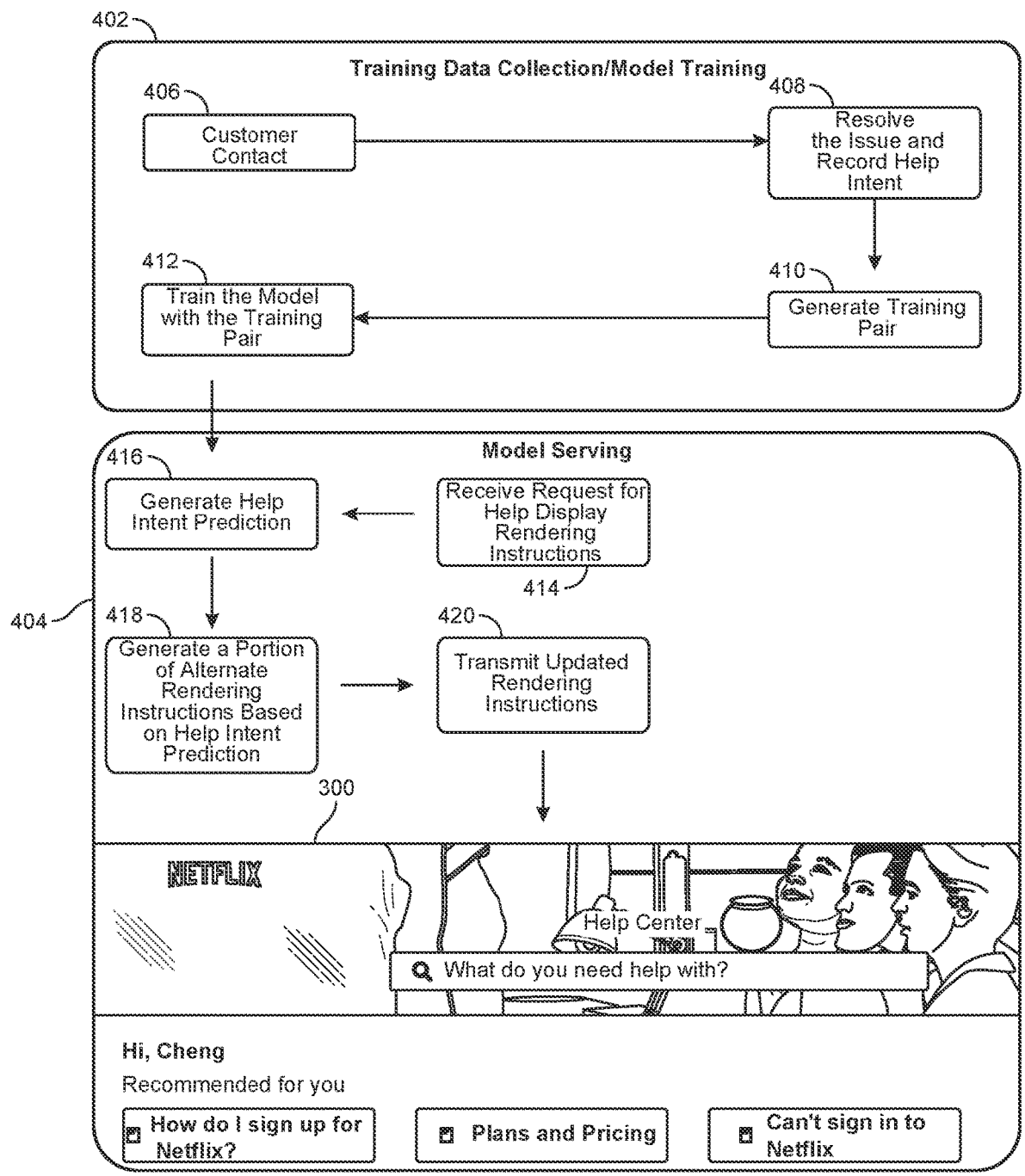
FIG. 4 illustrates an overview of how the help intent prediction system trains a help intent machine learning model in accordance with one or more implementations.
Figure 5:
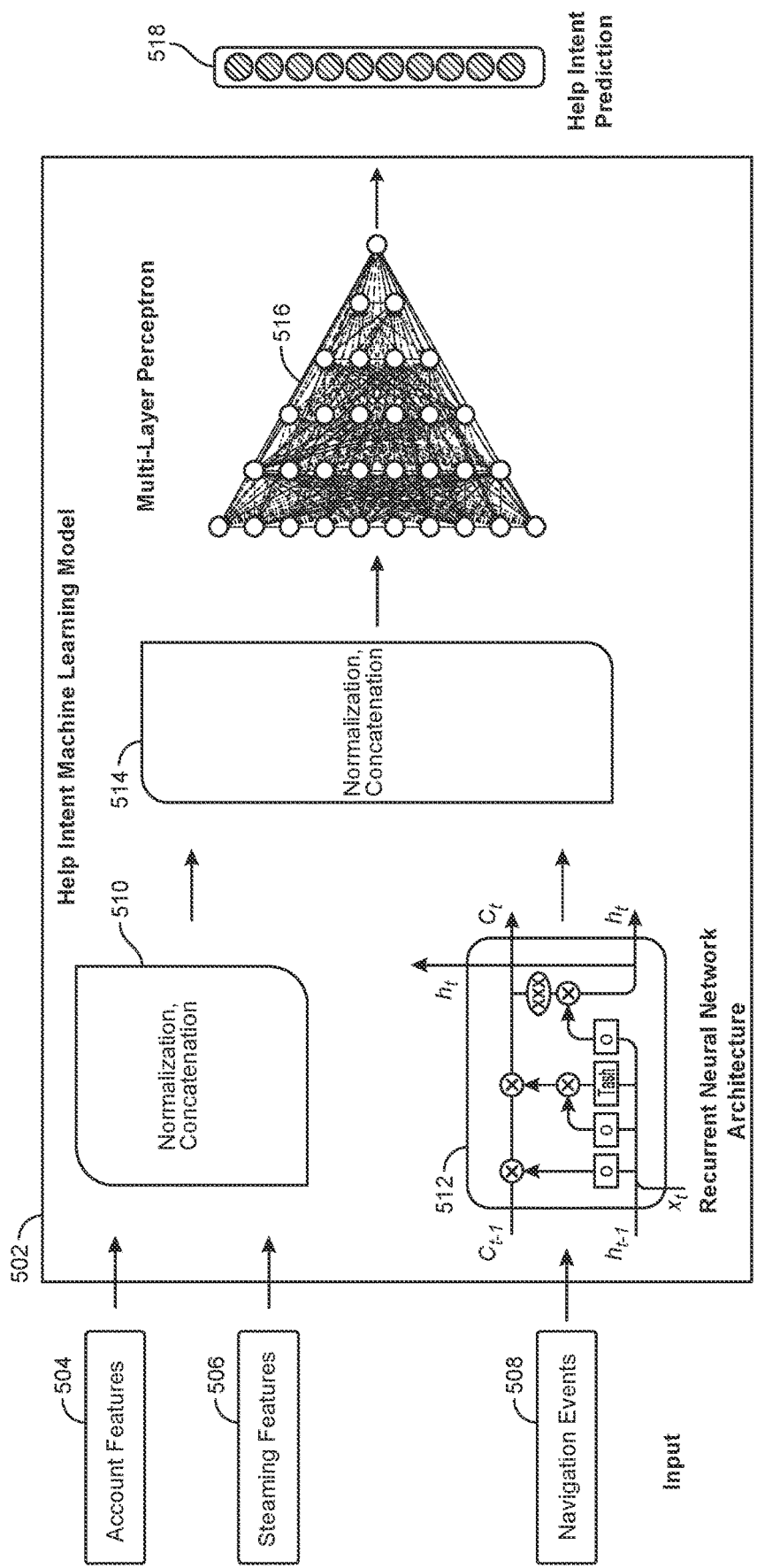
FIG. 5 illustrates an overview of the help intent machine learning model applied by the help intent prediction system to generate help intent predictions in accordance with one or more implementations.
Figure 6:
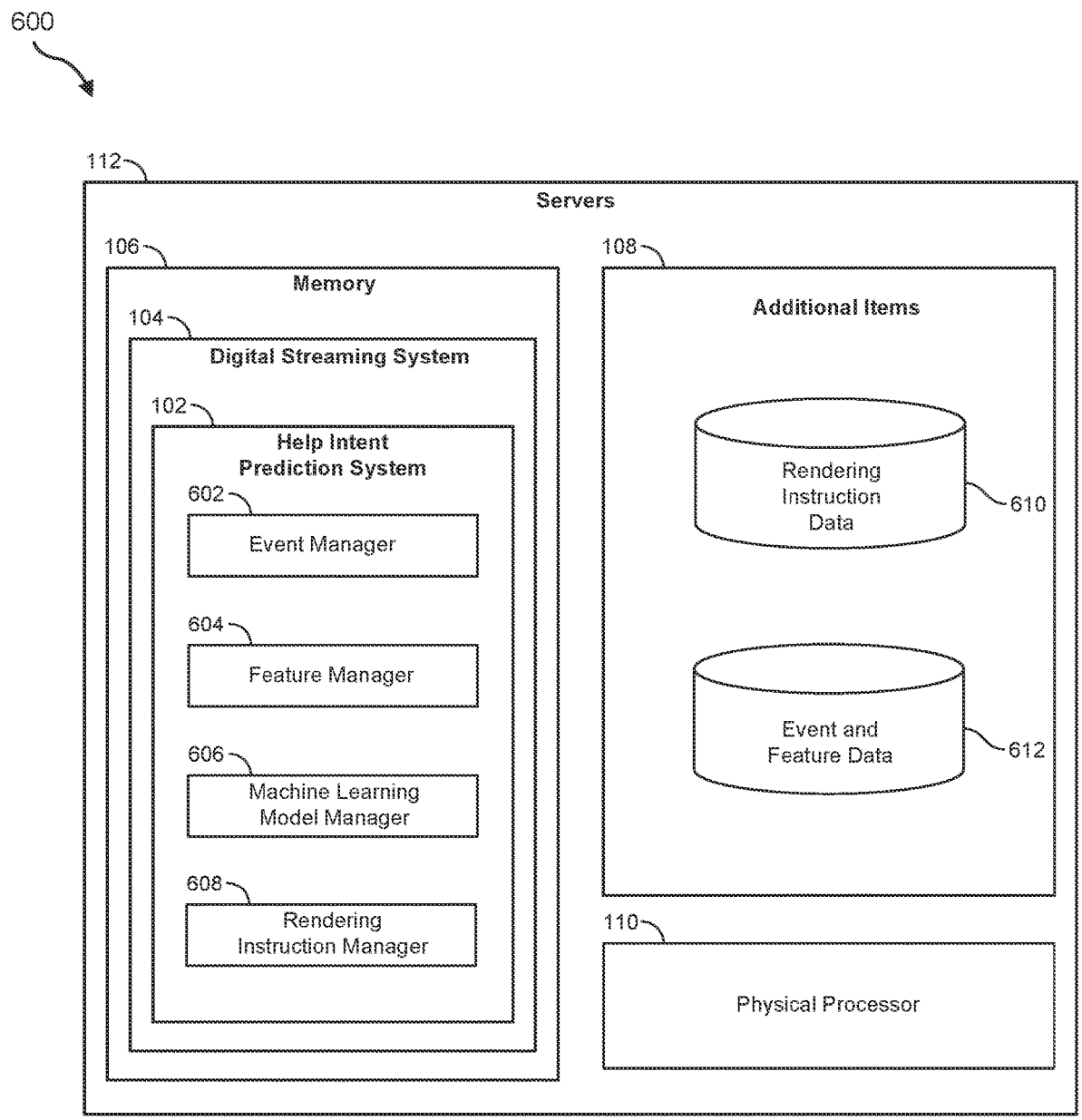
FIG. 6 illustrates an overview of the help intent prediction system in accordance with one or more implementations.
Figure 7:
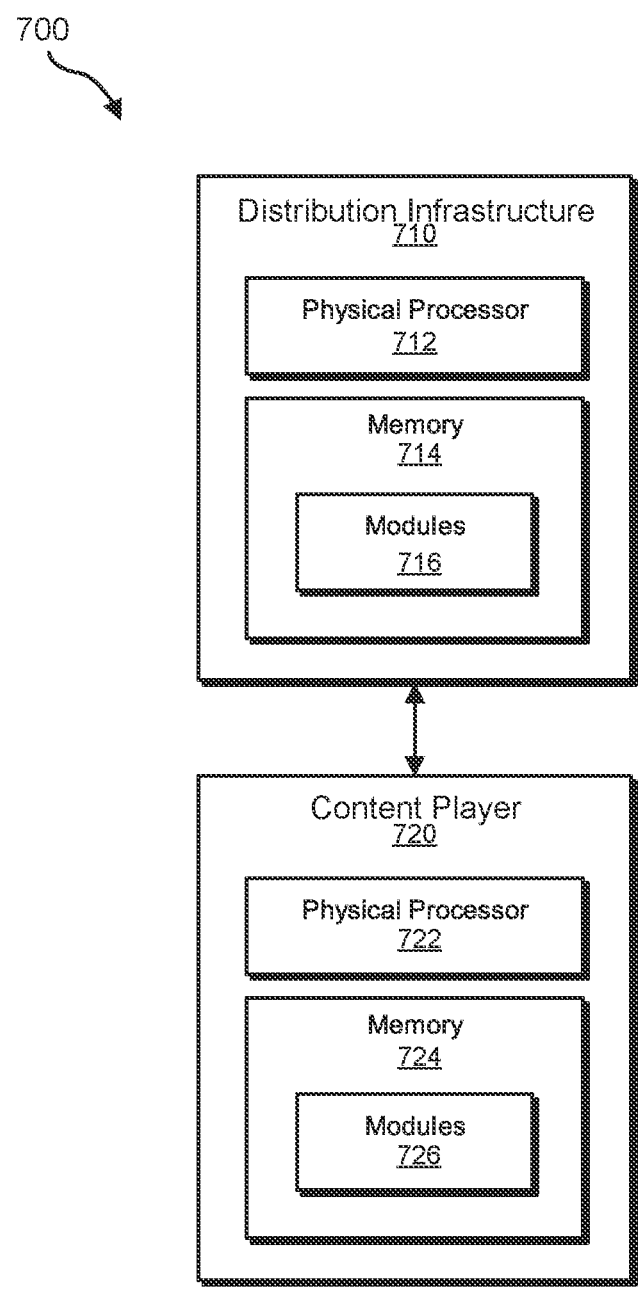
FIG. 7 illustrates a block diagram of an exemplary content distribution ecosystem.
Figure 8:
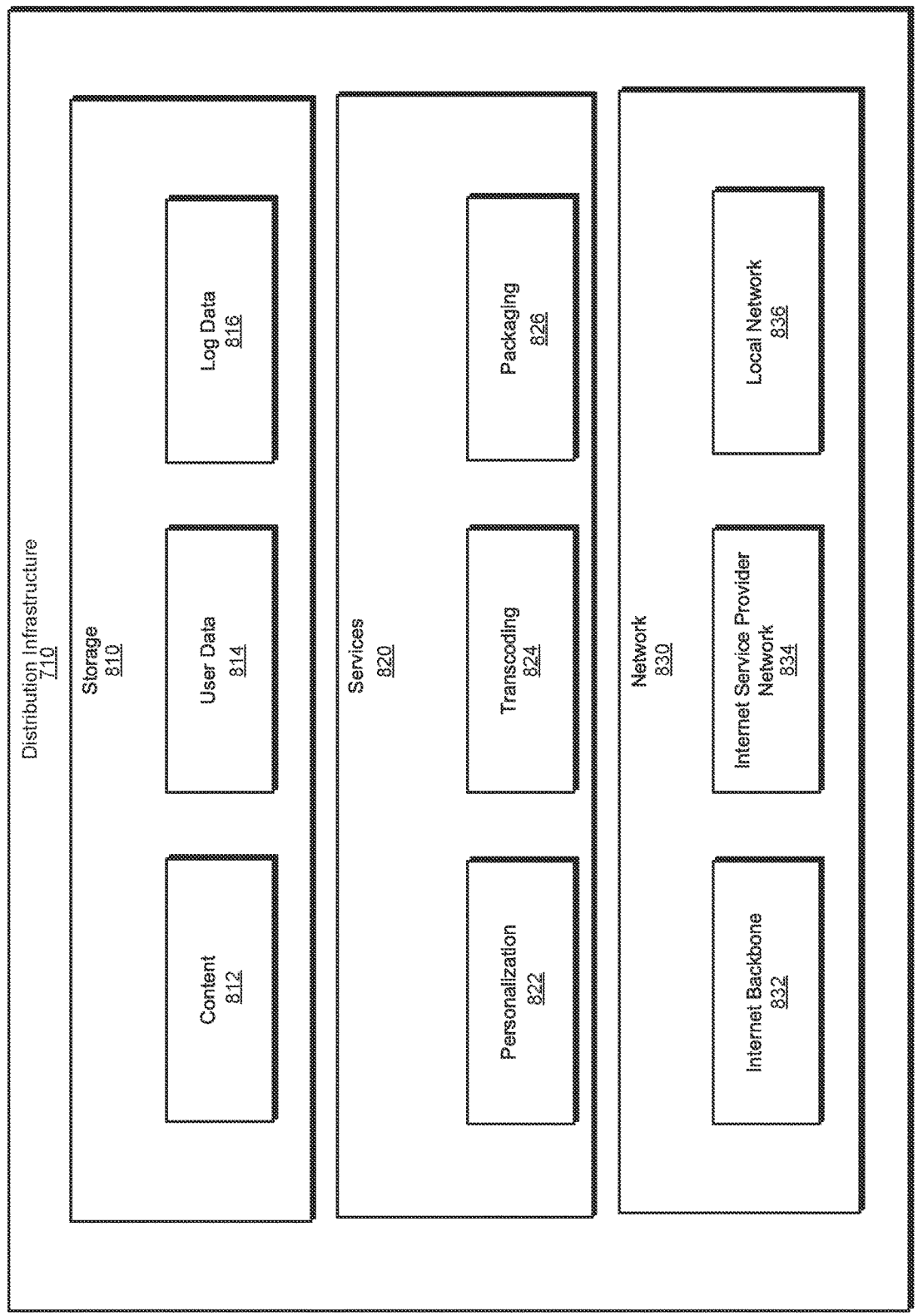
FIG. 8 illustrates a block diagram of an exemplary distribution infrastructure within the content distribution ecosystem shown in FIG. 7.
Figure 9:
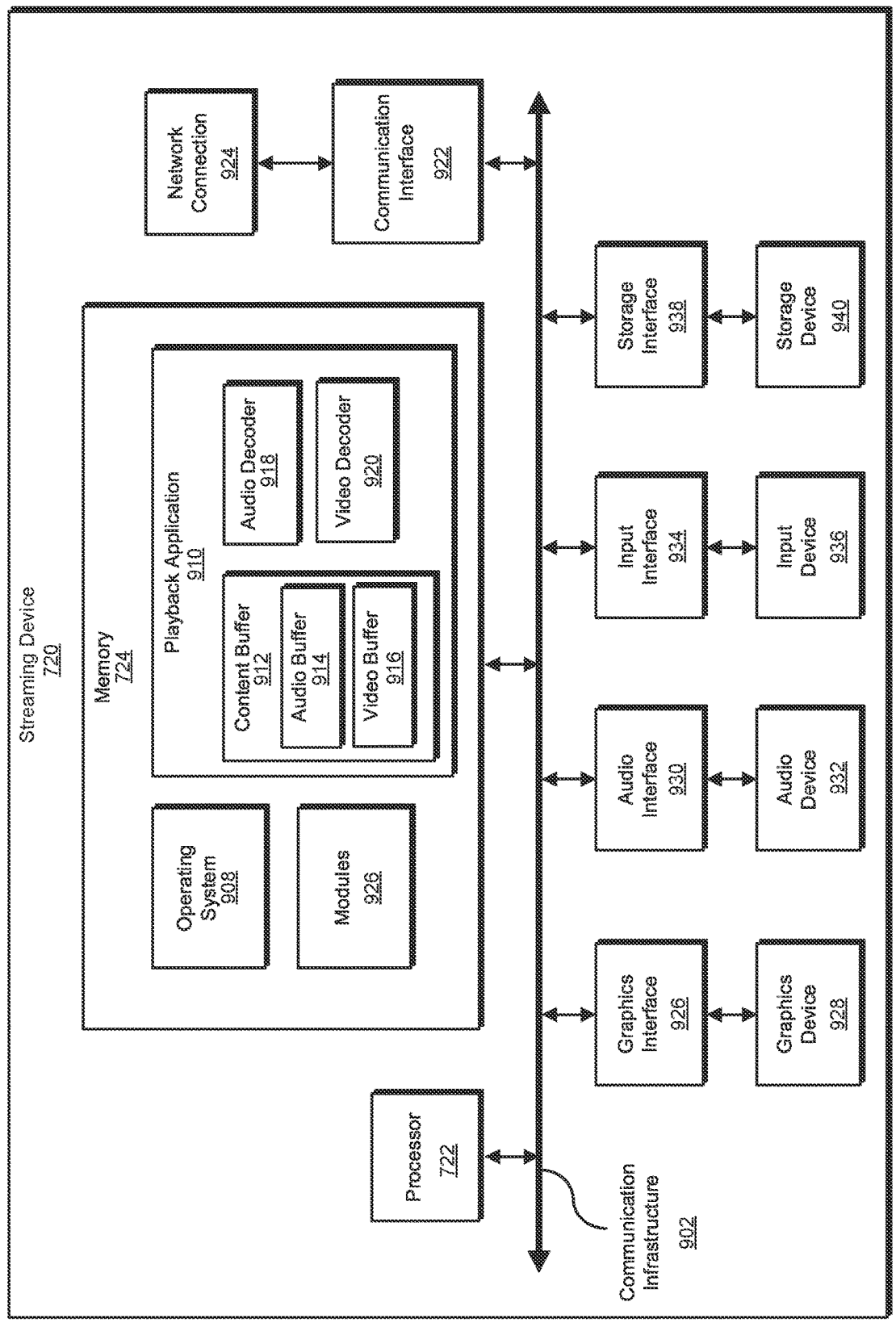
FIG. 9 illustrates a block diagram of an exemplary content player within the content distribution ecosystem shown in FIG. 8.

The following will provide, with reference to FIGS. 1-7, detailed descriptions of a help intent prediction system that predicts the type of help that a digital streaming system user will need and customizes a help display for that user based on the prediction. For example, an exemplary network environment is illustrated in FIG. 1 to show the help intent prediction system operating in connection with one or more client devices that stream content from a digital streaming system. FIG. 2 illustrates steps taken by the help intent prediction system in predicting a user's help intent and customizing a help display for that user. FIGS. 3A and 3B illustrate an example help display that has been customized with help solutions that are tailored to a particular user's help intent prediction. FIGS. 4 and 5 illustrate a help intent machine learning model that generates help intent predictions as well as how training data is generated for the help intent machine learning model. Additionally, FIG. 6 provides additional detail with regard to the features and functionality of the help intent prediction system. FIGS. 7, 8, and 9 provide additional detail with regard to an exemplary distribution infrastructure within an exemplary content distribution ecosystem and an exemplary content player that operates within the exemplary content distribution ecosystem.

As just mentioned, FIG. 1 illustrates an exemplary networking environment 100 implementing aspects of the present disclosure. For example, the networking environment 100 includes server(s) 112, client devices 114a-114n, and a network 124. As further shown, the server(s) 112 and the client devices 114a-114n include memories 106 and 118a-118n, additional items 108 and 120a-120n, and physical processors 110 and 122a-122n, respectively.

In one or more implementations, as shown in FIG. 1, the client devices 114a-114n are devices that are capable of digital content item playback. For example, in some implementations, the client devices 114a-114n are any of smartphones, tablets, laptop computers, desktop computers, smart wearables, virtual reality headsets, and so forth. In at least one implementation any of the client devices 114a-114n are set-top devices that receive streamed input from the server (s) 112 and provide the streamed content to a television for playback.

As further shown in FIG. 1, a help intent prediction system 102 is implemented as part of a digital streaming system 104 within the memory 106 on the server(s) 112. In one or more implementations, the digital streaming system 104 includes a subscription streaming service for providing digital media content to subscribers. In one or more examples, this digital media content includes non-interactive content such as movies and TV shows, as well as interactive content such as video games. Moreover, the digital streaming system 104 also provides static information such as menus and selectable thumbnails associated with digital media items.

As further shown in FIG. 1, the client devices 114a-114n include digital streaming system applications 116a-116n within the memories 118a-118n, respectively. In some implementations, the digital streaming system applications 116a-116n include some or all of the functionality of the help intent prediction system 102. In at least one implementation, the digital streaming system applications 116a-116n transmit session data to the help intent prediction system 102. In some implementations, the digital streaming system applications 116a-116n are native applications installed on the client devices 114a-114n. In additional implementations, the digital stream system applications 116a-116n are accessed via a web browser installed on the client devices 114a-114n.

As mentioned above, the client devices 114a-114n are communicatively coupled with the server(s) 112 through the network 124. In one or more implementations, the network 124 represents any type or form of communication network, such as the Internet, and includes one or more physical connections, such as a LAN, and/or wireless connections, such as a WAN. In some implementations, the network 124 represents a telecommunications carrier network. In at least one implementation, the network 124 represents combinations of networks.

Although FIG. 1 illustrates components of the exemplary networking environment 100 in one arrangement, other arrangements are possible. For example, in one implementation, the help intent prediction system 102 operates as a native application installed on any of the client devices 114a-114n. In another implementation, the help intent prediction system 102 operates across multiple servers. In additional implementations, the exemplary networking environment 100 includes any number of client devices across any number of users, regions, geofenced areas, countries, and so forth.

As mentioned above, FIG. 2 is a flow diagram of an exemplary computer-implemented method 200 for customizing a digital streaming service help display based on a predicted help intent associated with a specific user. The steps shown in FIG. 2 may be performed by any suitable computer-executable code and/or computing system, including the system(s) illustrated in FIG. 6. In one example, each of the steps shown in FIG. 2 may represent an algorithm whose structure includes and/or is represented by multiple sub-steps, examples of which will be provided in greater detail below.

As illustrated in FIG. 2, at step 210 the help intent prediction system 102 receives a request for rendering instructions for rendering a help display of a digital streaming system on a client device of a digital streaming system user. For example, in some implementations, the help intent prediction system 102 receives the request from the digital streaming system application 116a installed on the client device 114a. In additional implementations, the help intent prediction system 102 receives the request from a web browser on the client device 114a. As such, the request for rendering instructions is for graphical user interface rendering instructions in some implementations, or for web page rendering instructions in other implementations. In one or more implementations, and in response to the received request, the help intent prediction system 102 identifies the requested instructions from a repository of pre-configured rendering instructions.

As further illustrated in FIG. 2, at step 220 the help intent prediction system 102 determines one or more navigation events associated with the digital streaming system over a previous predetermined amount of time. For example, the help intent prediction system 102 determines a sequence of navigation events including interactions and displays that have been selected and rendered via the digital streaming system application 116a on the client device 114a. In at least one implementation, the help intent prediction system 102 determines this sequence of navigation events over a past predetermined amount of time (e.g., 24 hours, 12 hours).

As further illustrated in FIG. 2, at step 230 the help intent prediction system 102 determines additional digital streaming system features associated with the digital streaming system user. For example, the help intent prediction system 102 determines additional digital streaming system features including account features and streaming features. To illustrate, account features associated with the user can include, but are not limited to, a digital streaming system plan type associated with the user, a digital streaming system account age associated with the user, geographic information for a digital streaming system account associated with the user, or historical information indicated by the digital streaming system account associated with the user. Moreover, streaming features associated with the user can include, but are not limited to, an amount of streaming time associated with a digital streaming system account of the user, a streaming frequency associated with the digital streaming system account of the user, a number of profiles associated with the digital streaming system account of the user, or a streaming history associated with the digital streaming system account of the user.

As further illustrated in FIG. 2, at step 240 the help intent prediction system 102 applies a help intent machine learning model to the one or more navigation events and the additional digital streaming system features to generate a help intent prediction. For example, in one or more implementations, the help intent prediction system 102 applies the help intent machine learning model by applying a long short-term memory (LSTM) network to the one or more navigation events to generate a vector representing the sequence of displays viewed by the user and display components with which the user interacted over a past predetermined amount of time. The help intent prediction system 102 further applies the help intent machine learning model by applying additional algorithms and/or modules to the account and streaming features associated with the user to generate an additional vector representation of these features. Finally, the help intent prediction system 102 normalizes and concatenates the generated vectors prior to applying a multi-layer perceptron to the result to generate a help intent prediction as to one or more help intents associated with the user.

As further illustrated in FIG. 2, at step 250 the help intent prediction system 102 replaces at least one portion of the rendering instructions with a portion of alternate rendering instructions based on the help intent prediction. For example, the help intent prediction system 102 generates rendering instructions that are customized to the user and include instructions for displaying selectable content associated with the help intent prediction generated by the help intent machine learning model. In at least one implementation, the help intent prediction system 102 generates these customized rendering instructions including links to self-help articles that are specific to the help intent prediction. Moreover, the help intent prediction system 102 replaces one or more portions of the pre-configured rendering instructions for the help display with the customized rendering instructions that are specific to the user.

As further illustrated in FIG. 2, at step 260 the help intent prediction system 102 transmits the rendering instructions including the portion of alternate rendering instructions to the client device for rendering on the client device. For example, the help intent prediction system 102 transmits the updated rendering instructions to the client device 114a in a way that causes the digital streaming system application 116a installed hereon to render the help display according to the instructions.

As just discussed, the help intent prediction system 102 dynamically updates a help display of the digital streaming system 104 to include customized help solutions for a specific user that are ready upon the user first viewing the help display (e.g., prior to the user asking a question, typing a query, etc.). FIGS. 3A and 3B illustrate implementations of a help display 300 of the digital streaming system 104 that has been dynamically updated by the help intent prediction system 102. For example, as shown in FIG. 3A, in response to receiving a request from the client device 114a for rendering instructions for rendering a help display, the help intent prediction system 102 determines navigation events and other features associated with the digital streaming system application 116a installed on the client device 114a and with the digital streaming system user of the client device 114a. The help intent prediction system 102 then applies a help intent machine learning model to the determined events and features to generate a help intent prediction associated with the user, as will be discussed in greater detail below with regard to FIGS. 4 and 5.

Based on the generated help intent prediction, the help intent prediction system 102 generates rendering instructions for displaying selectable content associated with the help intent prediction. In one or more implementations, "rendering instructions" refer to computer code or script that causes a client device to render a visual display in a particular way. To illustrate, in one example, rendering instructions refer to hyper-text markup language (HTML) script—or similar—that is renderable by a web browser on the client device 114a. In another example, rendering instructions refer to computer code that is rendered by the digital streaming system application 116a on the client device 114a for display as part of a native application.

As shown in the example illustrated in FIG. 3A, the help intent prediction system 102 generates rendering instructions for rendering a portion 302 of the help display 300 that includes customized selectable content. In the example shown in FIG. 3A, the customized selectable content includes links 304a, 304b, and 304c. In one implementation, each of the links 304a-304c is associated with a self-help article that is highly related to the help intent prediction. Thus, in some implementations, the help display 300 is a web page viewed via a web browser on the client device 114a. In additional implementations, the help display 300 is a display viewed as part of the digital streaming system application 116a installed as a native application on the client device 114a. In yet further implementations, the help display 300 can be any other type of display (e.g., an augmented reality display, a virtual reality display) viewable via the client device 114a.

In at least one implementation, the help intent prediction system 102 applies the help intent machine learning model to generate a help intent prediction that includes a top number of help intent categories. To illustrate, in that implementation, the help intent machine learning model outputs a vector of probability for each of a total number of help categories. The help intent prediction system 102 then identifies a top number (e.g., three) of most probable help categories then identifies a solution (e.g., a self-help article, an instructive video) associated with each of the identified help categories.

As such, in one implementation, each of the links 304a-304c are associated with the top three self-help articles that are most relevant to a single help category (e.g., "change membership plan"). In an additional implementation, the link 304a is associated with a self-help article that is most relevant to a first help category (e.g., "change membership plan"), while the link 304b is associated with a self-help article that is most relevant to a second help category (e.g., "trouble streaming") and the link 304c is associated with a self-help article that is most relevant to a third help category (e.g., "change my password"). In additional implementations, each of the links 304a-304c are associated with different help modalities (e.g., articles, video demonstrations, chat groups, etc.).

As mentioned above, the help intent prediction system 102 replaces at least one portion of the help display 300 with the portion 302 including the customized help solutions. In at least one implementation, the help intent prediction system 102 replaces a portion of the help display 300 with the portion 302 such that the positioning of an additional portion 308 within the help display 300 remains unchanged.

In additional implementations, such as shown in FIG. 3B, the help intent prediction system 102 can replace a side portion with a portion 306 including the links 304a-304c in a different configuration than what is shown in FIG. 3A. For example, as shown in FIG. 3B, the help intent prediction system 102 can replace a side portion with the portion 306 such that the positioning of an additional portion 310 remains unchanged in a sidebar of the help display 300. In yet other additional implementations, the help intent prediction system 102 can replace any portion of the help display 300 with the newly generated portion including the customized help solutions. It follows that, prior to having one or more portions replaced by the help intent prediction system 102 the help display 300 includes only the portion 308 as shown in FIG. 3A and/or the portion 310 as shown in FIG. 3B that includes general help information.

FIG. 4 illustrates additional information with regard to how the help intent prediction system 102 trains and utilizes the help intent machine learning model. For example, as shown in FIG. 4, the help intent prediction system 102 utilizes a training phase 402 and then a live usage phase 404 for the help intent machine learning model. In the training phase 402, a digital streaming system user contacts customer service associated with the digital streaming system 104 in a step 406. This contact may be a live phone call, a text message, an email, or any other type of contact. In a step 408, the digital streaming system 104 resolves the user's issue in any one of a variety of ways (e.g., explaining what the user needs to do, providing the user with an article, updating the user's account within the digital streaming system 104, etc.). In the step 408, the digital streaming system 104 further records the intent (e.g., one or more categories of possible help intents) with which the solution to the user's issue is associated. Example help intents include, but are not limited to, "payment issue," "streaming problem," "resolution too low," "change membership level," and so forth.

In a step 410, the help intent prediction system 102 generates a training pair for the help intent machine learning model including the logged help intent (i.e., the user's reason for contacting customer service). Following this, at a step 412, the help intent prediction system 102 trains the help intent machine learning model with the generated training pair. In one or more implementations, the help intent prediction system 102 repeats the training phase 402 multiple times (e.g., thousands of times) by applying the help intent machine learning model to the user intent in each training pair, comparing the training output of the help intent machine learning model to the training pair ground truth (e.g., the given solution in the training pair), and then backpropagating the result of the comparison through the help intent machine learning model. The help intent prediction system 102 repeats this process over many training cycles until the comparisons between the training outputs and the ground truths of the training pairs converge.

Once the help intent machine learning model is trained in the training phase 402, the help intent prediction system 102 applies the help intent machine learning model to new, unknown inputs. For example, in the live usage phase 404, the help intent prediction system 102 receives a request for help display rendering instructions from the client device 114a in a step 414. In response to this received request, the help intent prediction system 102 determines navigation events and other features associated with the user of the client device 114a and applies the trained help intent machine learning model to the determined events and features to generate a help intent prediction for the user in a step 416.

At a step 418, the help intent prediction system 102 generates a portion of alternate rendering instructions including selectable content that is customized to the generated help intent prediction. As discussed above with reference to the example shown in FIG. 3, the help intent prediction system 102 generates the alternate rendering instructions including instructions for rendering links to self-help articles that are specific to the help intent prediction. The help intent prediction system 102 further replaces one or more portions of the pre-configured rendering instructions for the help display 300 with the newly generated alternate rendering instructions. Finally, at a step 420, the help intent prediction system 102 transmits the rendering instructions for the help display 300 including the portion of alternate rendering instructions to the client device 114a to cause the client device 114a to render the help display 300 via the digital streaming system application 116a installed thereon.

FIG. 5 illustrates additional detail with regard to a help intent machine learning model 502—such as the help intent machine learning model discussed above. In one or more implementations, the help intent prediction system 102 applies the help intent machine learning model 502 to both navigation events 508 and to additional digital streaming system features such as account features 504 and streaming features 506.

In more detail, the help intent prediction system 102 determines navigation events 508 by identifying navigation events within the digital streaming system application 116a on the client device 114a (e.g., the client device where the request for rendering instructions originated). In one or more implementations, the digital streaming system application 116a monitors navigation events including, but not limited to, page views, content item selections, link clicks, scroll speeds, menu option selections, content item views, logins, logouts, and so forth. In at least one implementation, the digital streaming system application 116a provides a sequence of such navigation events to the help intent prediction system 102. In one example, the digital streaming system application 116a provides the sequence of navigation events over a previous predetermined amount of time (e.g., the previous 24 hours, the previous 12 hours, the previous 1 hour).

Additionally, as mentioned above, the help intent prediction system 102 determines additional digital streaming system features including the account features 504 and the streaming features 506. In one or more implementations, the account features 504 include, but are not limited to a digital streaming system plan type associated with the user of the client device 114a, a digital streaming system account age associated with the user of the client device 114a, geographic information for a digital streaming system account associated with the user of the client device 114a, and historical information indicated by the digital streaming system account associated with the user of the client device 114a. In one or more examples, the help intent prediction system 102 determines this information based on information from the digital streaming system 104 and/or the digital streaming system application 116a.

Moreover, in one or more implementations, the help intent prediction system 102 determines streaming features 506 including, but not limited to an amount of streaming time associated with a digital streaming system account of the user of the client device 114a, a streaming frequency associated with the digital streaming system account of the user of the client device 114a, a number of profiles associated with the digital streaming system account of the user of the client device 114a, and a streaming history associated with the digital streaming system account of the user of the client device 114a. As with the account features 504 discussed above, the help intent prediction system 102 determines the streaming features 506 based on information from the digital streaming system 104 and/or the digital streaming system application 116a.

In one or more implementations, the help intent machine learning model 502 utilizes the account features 504, the streaming features 506, and the navigation events 508 in different ways. As in the example shown in FIG. 5, the help intent machine learning model 502 inputs the account features 504 and the streaming features 506 into a first normalization and concatenation module 510. In one or more implementations, the first normalization and concatenation module 510 generates a first feature representation of the account features 504 and the streaming features 506.

Additionally, as shown in FIG. 5, the help intent machine learning model 502 inputs the navigation events 508 into a recurrent neural network architecture 512. In one or more implementations, the navigation events 508 can include a large number of navigation events. Moreover, the sequence of the events is also meaningful in addition to the events themselves. As such, the help intent machine learning model 502 utilizes the recurrent neural network architecture 512 to encode the sequence of sparse event identifiers associated with the events in the navigation events 508. The recurrent neural network architecture 512 then learns this event encoding end-to-end with the objective of minimizing error when predicting the intent of the user of the client device 114a when landing on the help display of the digital streaming system 104. In one or more implementations, the recurrent neural network architecture 512 encodes the sequence of events in the navigation events 508 into a dense embedding. This dense embedding can then be combined with other dense and one-hot categorical features for the classification task of predicting the user's help intent.

In at least one implementation, the recurrent neural network architecture 512 includes a long-short term memory (LSTM) model to encode the sequence of events in the navigation events 508. Moreover, in at least one implementation, the recurrent neural network architecture 512 includes a max-pool layer that receives the hidden-state output of the LSTM model as the sequence embedding.

Next, the help intent machine learning model 502 applies a second normalization and concatenation module 514 to the sequence embedding output by the recurrent neural network architecture 512 and to the output of the first normalization and concatenation module 510. In at least one implementation, the help intent machine learning model 502 further applies a multi-layer perceptron 516 (e.g., a fully connected neural network) to the output of the second normalization and concatenation module 514 to generate a help intent prediction 518. In one or more examples, the help intent prediction 518 is a multi-class classification, such as a vector of probability associated with each possible help intent. In such an example, the help intent prediction system 102 may utilize the top one or more most probable help intents indicated by the vector.

As mentioned above, and as shown in FIG. 6, the help intent prediction system 102 performs various functions in connection with predicting the type of help that a digital streaming system user will need and customizing a help display for that user based on the prediction. FIG. 6 is a block diagram 600 of the help intent prediction system 102 operating within the memory 106 of the server(s) 112 while performing these functions. As such, FIG. 6 provides additional detail with regard to these functions. For example, in one or more implementations as shown in FIG. 6, the help intent prediction system 102 includes an event manager 602, a feature manager 604, a machine learning model manager 606, and a rendering instruction manager 608. As further shown in FIG. 6, the additional items 108 stores and maintains rendering instruction data 610 and event and feature data 612.

In certain implementations, the help intent prediction system 102 represents one or more software applications, modules, or programs that, when executed by a computing device, may cause the computing device to perform one or more tasks. For example, and as will be described in greater detail below, one or more of the event manager 602, the feature manager 604, the machine learning model manager 606, and the rendering instruction manager 608 may represent software stored and configured to run on one or more computing devices, such as the server(s) 112. One or more of the event manager 602, the feature manager 604, the machine learning model manager 606, or the rendering instruction manager 608 of the help intent prediction system 102 shown in FIG. 6 may also represent all or portions of one or more special purpose computers to perform one or more tasks.

As mentioned above, and as shown in FIG. 6, the help intent prediction system 102 includes the event manager 602. In one or more implementations, the event manager 602 determines sequences of navigation events associated with the digital streaming system application 116a on the client device 114a. For example, as discussed above, the event manager 602 generates a sequence of navigation events including, but not limited to, page lands, link clicks, content scrolls, item interactions, typed inputs, and so forth. In one or more implementations, the event manager 602 tracks sequences of navigation events for a previous predetermined amount of time (e.g., 1 hour, 12 hours). As such, in some implementations, the event manager 602 keeps a first-in-first-out sequence of navigation events that only includes those navigation events during that previous predetermined amount of time—with the oldest navigation event being deleted as soon as it falls outside the predetermined time window (e.g., older than the previous 12 hours).

As mentioned above, and as shown in FIG. 6, the help intent prediction system 102 includes the feature manager 604. In one or more implementations, the feature manager 604 determines additional digital streaming system features associated with the user of the client device 114a. For example, the feature manager 604 determines additional features including account features associated with the user and streaming features associated with the user. In at least one implementation, these additional digital streaming system features help to inform the help intent machine learning model 502 as to how the user utilizes the digital streaming system application 116a on the client device 114a—and anywhere else the user engages with the digital streaming system 104. As such, the feature manager 604 determines the additional digital streaming system features by monitoring the user's digital streaming system 104 use history, membership level, content streaming, and so forth.

As mentioned above, and as shown in FIG. 6, the help intent prediction system 102 includes the machine learning model manager 606. In one or more implementations, the machine learning model manager 606 generates the help intent machine learning model 502. For example as discussed above with reference to FIG. 5, in some examples, the machine learning model manager 606 generates the help intent machine learning model 502 including a recurrent neural network architecture 512 as well as additional normalization and concatenation modules and a multi-layer perceptron. In additional examples, the machine learning model manager 606 can generate the help intent machine learning model 502 including other modules and/or machine learning model components.

In one or more implementations, the machine learning model manager 606 further trains the help intent machine learning model 502 with training data pairs (e.g., training input features and ground truth outputs). To illustrate, the machine learning model manager 606 applies the help intent machine learning model 502 to the training input features and compares the output help intent predictions of the help intent machine learning model 502 to the corresponding ground truth outputs. The machine learning model manager 606 then back-propagates the results of these comparisons back through the help intent machine learning model 502. The machine learning model manager 606 repeats these training epochs until the comparisons converge. Once trained, the machine learning model manager 606 applies the help intent machine learning model 502 to new input features (e.g., navigation event sequences, account features, streaming features) at run time. In some implementations, the machine learning model manager 606 periodically retrains the help intent machine learning model 502 to ensure accuracy of the generated help intent predictions.

As mentioned above, and as shown in FIG. 6, the help intent prediction system 102 includes the rendering instruction manager 608. In one or more implementations, the rendering instruction manager 608 accesses preconfigured help display rendering instructions, generates portions of alternate rendering instructions based on a generated help intent prediction, and replaces portions of the preconfigured help display rendering instructions with the portions of alternate rendering instructions. For example, as shown in FIG. 3, the rendering instruction manager 608 generates portions of alternate rendering instructions including links to self-help articles that are tailored to a specific help intent prediction. The rendering instruction manager 608 then replaces a portion of preconfigured rendering instructions for a help display with this new portion. The result is that when the help display is rendered at the client device 114a according to the updated rendering instructions, the help display includes personalized content that is tailored to the user's most likely predicted problem.

As shown in FIGS. 1 and 6, the server(s) 112 and the client devices 114a-114n include one or more physical processors, such as the physical processors 110 and 122a-122n, respectively. The physical processors 110 and 122a-122n generally represent any type or form of hardware-implemented processing unit capable of interpreting and/or executing computer-readable instructions. In one implementation, the physical processors 110 and 122a-122n access and/or modify one or more of the components of the help intent prediction system 102. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally as shown in FIGS. 1 and 6, the server(s) 112 and the client devices 114a-114n include memories 106 and 118a-118n, respectively. In one or more implementations, the memories 106 and 118a-118n generally represent any type or form of volatile or non-volatile storage device or medium capable of storing data and/or computer-readable instructions. In one example, the memories 106 and 118a-118n store, load, and/or maintain one or more of the components of the help intent prediction system 102. Examples of the memories 106 and 118a-118n include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIG. 6, the server(s) 112 includes the additional items 108. On the server(s) 112, the additional items 108 include rendering instruction data 610 and event and feature data 612. In one or more implementations, the rendering instruction data 610 includes preconfigured rendering instructions for displays that are part of the digital streaming system application 116a. For example, the rendering instruction data 610 includes preconfigured rendering instructions for a help display. Additionally, in one or more implementations, the event and feature data 612 include data specific to how digital streaming system 104 users stream content, navigate through the digital streaming system application, and otherwise interact with the digital streaming system 104.

In summary, the help intent prediction system 102 increases the efficiency and accuracy with which the digital streaming system 104 solves problems for its users. As discussed above, previous systems engaged customer service solutions that necessitated the expenditure of vast reserves of computing resources while users manually searched through self-help libraries, texted with self-help chat bots, and waited in call-in phone queues. Conversely, the help intent prediction system 102 efficiently leverages behavioral and usage information about digital streaming system 104 users to predict problems beforehand, and then customizes a help display so that users are presented with a direct solution when they first land on a help display of the digital streaming system 104.

The following will provide, with reference to FIG. 7, detailed descriptions of exemplary ecosystems in which content is provisioned to end nodes and in which requests for content are steered to specific end nodes. The discussion corresponding to FIGS. 8 and 9 presents an overview of an exemplary distribution infrastructure and an exemplary content player used during playback sessions, respectively. These exemplary ecosystems and distribution infrastructures are implemented in any of the embodiments described above with reference to FIGS. 1-6.

FIG. 7 is a block diagram of a content distribution ecosystem 700 that includes a distribution infrastructure 710 in communication with a content player 720. In some embodiments, distribution infrastructure 710 is configured to encode data at a specific data rate and to transfer the encoded data to content player 720. Content player 720 is configured to receive the encoded data via distribution infrastructure 710 and to decode the data for playback to a user. The data provided by distribution infrastructure 710 includes, for example, audio, video, text, images, animations, interactive content, haptic data, virtual or augmented reality data, location data, gaming data, or any other type of data that is provided via streaming.

Distribution infrastructure 710 generally represents any services, hardware, software, or other infrastructure components configured to deliver content to end users. For example, distribution infrastructure 710 includes content aggregation systems, media transcoding and packaging services, network components, and/or a variety of other types of hardware and software. In some cases, distribution infrastructure 710 is implemented as a highly complex distribution system, a single media server or device, or anything in between. In some examples, regardless of size or complexity, distribution infrastructure 710 includes at least one physical processor 712 and memory 714. One or more modules 716 are stored or loaded into memory 714 to enable adaptive streaming, as discussed herein.

Content player 720 generally represents any type or form of device or system capable of playing audio and/or video content that has been provided over distribution infrastructure 710. Examples of content player 720 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 710, content player 720 includes a physical processor 722, memory 724, and one or more modules 726. Some or all of the adaptive streaming processes described herein is performed or enabled by modules 726, and in some examples, modules 716 of distribution infrastructure 710 coordinate with modules 726 of content player 720 to provide adaptive streaming of digital content.

In certain embodiments, one or more of modules 716 and/or 726 in FIG. 7 represent one or more software applications or programs that, when executed by a computing device, cause the computing device to perform one or more tasks. For example, and as will be described in greater detail below, one or more of modules 716 and 726 represent modules stored and configured to run on one or more general-purpose computing devices. One or more of modules 716 and 726 in FIG. 7 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 712 and 722 generally represent any type or form of hardware-implemented processing unit capable of interpreting and/or executing computer-readable instructions. In one example, physical processors 712 and 722 access and/or modify one or more of modules 716 and 726, respectively. Additionally or alternatively, physical processors 712 and 722 execute one or more of modules 716 and 726 to facilitate adaptive streaming of digital content. Examples of physical processors 712 and 722 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 714 and 724 generally represent any type or form of volatile or non-volatile storage device or medium capable of storing data and/or computer-readable instructions. In one example, memory 714 and/or 724 stores, loads, and/or maintains one or more of modules 716 and 726. Examples of memory 714 and/or 724 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 8 is a block diagram of exemplary components of distribution infrastructure 710 according to certain embodiments. Distribution infrastructure 710 includes storage 810, services 820, and a network 830. Storage 810 generally represents any device, set of devices, and/or systems capable of storing content for delivery to end users. Storage 810 includes a central repository with devices capable of storing terabytes or petabytes of data and/or includes distributed storage systems (e.g., appliances that mirror or cache content at Internet interconnect locations to provide faster access to the mirrored content within certain regions). Storage 810 is also configured in any other suitable manner.

As shown, storage 810 may store a variety of different items including content 812, user data 814, and/or log data 816. Content 812 includes television shows, movies, video games, user-generated content, and/or any other suitable type or form of content. User data 814 includes personally identifiable information (PII), payment information, preference settings, language and accessibility settings, and/or any other information associated with a particular user or content player. Log data 816 includes viewing history information, network throughput information, and/or any other metrics associated with a user's connection to or interactions with distribution infrastructure 710.

Services 820 includes personalization services 822, transcoding services 824, and/or packaging services 826. Personalization services 822 personalize recommendations, content streams, and/or other aspects of a user's experience with distribution infrastructure 710. Transcoding services 824 compress media at different bitrates which, as described in greater detail below, enable real-time switching between different encodings. Packaging services 826 package encoded video before deploying it to a delivery network, such as network 830, for streaming.

Network 830 generally represents any medium or architecture capable of facilitating communication or data transfer. Network 830 facilitates communication or data transfer using wireless and/or wired connections. Examples of network 830 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 8, network 830 includes an Internet backbone 832, an internet service provider network 834, and/or a local network 836. As discussed in greater detail below, bandwidth limitations and bottlenecks within one or more of these network segments triggers video and/or audio bit rate adjustments.

FIG. 9 is a block diagram of an exemplary implementation of content player 720 of FIG. 7. Content player 720 generally represents any type or form of computing device capable of reading computer-executable instructions. Content player 720 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 9, in addition to processor 722 and memory 724, content player 720 includes a communication infrastructure 902 and a communication interface 922 coupled to a network connection 924. Content player 720 also includes a graphics interface 926 coupled to a graphics device 928, an audio interface 930 coupled to an audio device 932, an input interface 934 coupled to an input device 936, and a storage interface 938 coupled to a storage device 940.

Communication infrastructure 902 generally represents any type or form of infrastructure capable of facilitating communication between one or more components of a computing device. Examples of communication infrastructure 902 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 724 generally represents any type or form of volatile or non-volatile storage device or medium capable of storing data and/or other computer-readable instructions. In some examples, memory 724 stores and/or loads an operating system 908 for execution by processor 722. In one example, operating system 908 includes and/or represents software that manages computer hardware and software resources and/or provides common services to computer programs and/or applications on content player 720.

Operating system 908 performs various system management functions, such as managing hardware components (e.g., graphics interface 926, audio interface 930, input interface 934, and/or storage interface 938). Operating system 908 also provides process and memory management models for playback application 910. The modules of playback application 910 includes, for example, a content buffer 912, an audio decoder 918, and a video decoder 920.

Playback application 910 is configured to retrieve digital content via communication interface 922 and play the digital content through graphics interface 926 and audio interface 930. Graphics interface 926 is configured to transmit a rendered video signal to graphics device 928. Audio interface 930 is configured to transmit a rendered audio signal to audio device 932. In normal operation, playback application 910 receives a request from a user to play a specific title or specific content. Playback application 910 then identifies one or more encoded video and audio streams associated with the requested title.

In one embodiment, playback application 910 begins downloading the content associated with the requested title by downloading sequence data encoded to the lowest audio and/or video playback bitrates to minimize startup time for playback. The requested digital content file is then downloaded into content buffer 912, which is configured to serve as a first-in, first-out queue. In one embodiment, each unit of downloaded data includes a unit of video data or a unit of audio data. As units of video data associated with the requested digital content file are downloaded to the content player 720, the units of video data are pushed into the content buffer 912. Similarly, as units of audio data associated with the requested digital content file are downloaded to the content player 720, the units of audio data are pushed into the content buffer 912. In one embodiment, the units of video data are stored in video buffer 916 within content buffer 912 and the units of audio data are stored in audio buffer 914 of content buffer 912.

A video decoder 920 reads units of video data from video buffer 916 and outputs the units of video data in a sequence of video frames corresponding in duration to the fixed span of playback time. Reading a unit of video data from video buffer 916 effectively de-queues the unit of video data from video buffer 916. The sequence of video frames is then rendered by graphics interface 926 and transmitted to graphics device 928 to be displayed to a user.

An audio decoder 918 reads units of audio data from audio buffer 914 and outputs the units of audio data as a sequence of audio samples, generally synchronized in time with a sequence of decoded video frames. In one embodiment, the sequence of audio samples is transmitted to audio interface 930, which converts the sequence of audio samples into an electrical audio signal. The electrical audio signal is then transmitted to a speaker of audio device 932, which, in response, generates an acoustic output.

In situations where the bandwidth of distribution infrastructure 710 is limited and/or variable, playback application 910 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 926 is configured to generate frames of video data and transmit the frames of video data to graphics device 928. In one embodiment, graphics interface 926 is included as part of an integrated circuit, along with processor 722. Alternatively, graphics interface 926 is configured as a hardware accelerator that is distinct from (i.e., is not integrated within) a chipset that includes processor 722.

Graphics interface 926 generally represents any type or form of device configured to forward images for display on graphics device 928. For example, graphics device 928 is fabricated using liquid crystal display (LCD) technology, cathode-ray technology, and light-emitting diode (LED) display technology (either organic or inorganic). In some embodiments, graphics device 928 also includes a virtual reality display and/or an augmented reality display. Graphics device 928 includes any technically feasible means for generating an image for display. In other words, graphics device 928 generally represents any type or form of device capable of visually displaying information forwarded by graphics interface 926.

As illustrated in FIG. 9, content player 720 also includes at least one input device 936 coupled to communication infrastructure 902 via input interface 934. Input device 936 generally represents any type or form of computing device capable of providing input, either computer or human generated, to content player 720. Examples of input device 936 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 720 also includes a storage device 940 coupled to communication infrastructure 902 via a storage interface 938. Storage device 940 generally represents any type or form of storage device or medium capable of storing data and/or other computer-readable instructions. For example, storage device 940 is a magnetic disk drive, a solid-state drive, an optical disk drive, a flash drive, or the like. Storage interface 938 generally represents any type or form of interface or device for transferring data between storage device 940 and other components of content player 720.

EXAMPLE EMBODIMENTS

Example 1: A computer-implemented method for predicting a user's help intent in relation to a digital streaming system and dynamically customize a help display based on the predicted help intent. For example, the method may include receiving a request for rendering instructions for rendering a help display of a digital streaming system on a client device of a digital streaming system user, determining one or more navigation events associated with the digital streaming system over a previous predetermined amount of time, determining additional digital streaming system features associated with the digital streaming system user, applying a help intent machine learning model to the one or more navigation events and the additional digital streaming system features to generate a help intent prediction, replacing at least one portion of the rendering instructions with a portion of alternate rendering instructions based on the help intent prediction, and transmitting the rendering instructions including the portion of alternate rendering instructions to the client device for rendering on the client device.

Example 2: The computer-implemented method of Example 1, wherein receiving the request for rendering instructions is via a digital streaming system application installed on the client device.

Example 3: The computer-implemented method of any of Examples 1 and 2, wherein the one or more navigation events associated with the digital streaming system include navigation events within the digital streaming system application.

Example 4: The computer-implemented method of any of Examples 1-3, wherein the previous predetermined amount of time is 24 hours.

Example 5: The computer-implemented method of any of Examples 1-4, wherein the additional digital streaming system features associated with the digital streaming system user include account features and streaming features.

Example 6: The computer-implemented method of any of Examples 1-5, wherein the account features include one or more of: a digital streaming system plan type associated with the digital streaming system user, a digital streaming system account age associated with the digital streaming system user, geographic information for a digital streaming system account associated with the digital streaming system user, or historical information indicated by the digital streaming system account associated with the digital streaming system user.

Example 7: The computer-implemented method of any of Examples 1-6, wherein the streaming features include one or more of: an amount of streaming time associated with a digital streaming system account of the digital streaming system user, a streaming frequency associated with the digital streaming system account of the digital streaming system user, a number of profiles associated with the digital streaming system account of the digital streaming system user, or a streaming history associated with the digital streaming system account of the digital streaming system user.

Example 8: The computer-implemented method of any of Examples 1-7, further including generating rendering instructions for displaying selectable content associated with the help intent prediction.

Example 9: The computer-implemented method of any of Examples 1-8, wherein replacing the at least one portion of the rendering instructions with the portion of alternate rendering instructions based on the help intent prediction includes replacing the at least one portion of the rendering instructions with the rendering instructions for displaying the selectable content associated with the help intent prediction.

Example 10: The computer-implemented method of any of Examples 1-9, further including applying the help intent machine learning model to the one or more navigation events and the additional digital streaming system features to generate additional help intent predictions, generating additional rendering instructions for displaying selectable content associated with the additional help intent predictions, and replacing additional portions of the rendering instructions with the additional rendering instructions.

In some examples, a system may include at least one processor and a physical memory including computer-executable instructions that, when executed by the at least one processor, cause the at least one processor to perform various acts. For example, the computer-executable instructions may cause the at least one processor to perform acts including receiving a request for rendering instructions for rendering a help display of a digital streaming system on a client device of a digital streaming system user, determining one or more navigation events associated with the digital streaming system over a previous predetermined amount of time, determining additional digital streaming system features associated with the digital streaming system user, applying a help intent machine learning model to the one or more navigation events and the additional digital streaming system features to generate a help intent prediction, replacing at least one portion of the rendering instructions with a portion of alternate rendering instructions based on the help intent prediction, and transmitting the rendering instructions including the portion of alternate rendering instructions to the client device for rendering on the client device.

In some examples, a method may be encoded as non-transitory, computer-readable instructions on a computer-readable medium. In one example, the computer-readable instructions, when executed by at least one processor of a computing device, cause the computing device to receive a request for rendering instructions for rendering a help display of a digital streaming system on a client device of a digital streaming system user, determine one or more navigation events associated with the digital streaming system over a previous predetermined amount of time, determine additional digital streaming system features associated with the digital streaming system user, apply a help intent machine learning model to the one or more navigation events and the additional digital streaming system features to generate a help intent prediction, replace at least one portion of the rendering instructions with a portion of alternate rendering instructions based on the help intent prediction, and transmit the rendering instructions including the portion of alternate rendering instructions to the client device for rendering on the client device.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of," Finally, for ease of use, the terms "including" and "having" (and their derivatives), as used in the specification and claims, are interchangeable with and have the same meaning as the word "comprising."

What is claimed is:

1. A computer-implemented method comprising:
   receiving a request for rendering instructions for rendering a help display of a digital streaming system on a client device of a digital streaming system user;
   determining one or more navigation events associated with the digital streaming system over a previous predetermined amount of time;
   determining additional digital streaming system features associated with the digital streaming system user;
   applying a help intent machine learning model to the one or more navigation events and the additional digital streaming system features to generate a help intent prediction;
   replacing at least one portion of the rendering instructions with a portion of alternate rendering instructions based on the help intent prediction; and
   transmitting the rendering instructions including the portion of alternate rendering instructions to the client device for rendering on the client device.

2. The computer-implemented method of claim 1, wherein receiving the request for rendering instructions is via a digital streaming system application installed on the client device.

3. The computer-implemented method of claim 2, wherein the one or more navigation events associated with the digital streaming system comprise navigation events within the digital streaming system application.

4. The computer-implemented method of claim 3, wherein the previous predetermined amount of time is 24 hours.

5. The computer-implemented method of claim 1, wherein the additional digital streaming system features associated with the digital streaming system user comprise account features and streaming features.

6. The computer-implemented method of claim 5, wherein the account features comprise one or more of: a digital streaming system plan type associated with the digital streaming system user, a digital streaming system account age associated with the digital streaming system user, geographic information for a digital streaming system account associated with the digital streaming system user, or historical information indicated by the digital streaming system account associated with the digital streaming system user.

7. The computer-implemented method of claim 5, wherein the streaming features comprise one or more of: an amount of streaming time associated with a digital streaming system account of the digital streaming system user, a streaming frequency associated with the digital streaming system account of the digital streaming system user, a number of profiles associated with the digital streaming system account of the digital streaming system user, or a streaming history associated with the digital streaming system account of the digital streaming system user.

8. The computer-implemented method of claim 1, further comprising generating rendering instructions for displaying selectable content associated with the help intent prediction.

9. The computer-implemented method of claim 8, wherein replacing the at least one portion of the rendering instructions with the portion of alternate rendering instructions based on the help intent prediction comprises replacing the at least one portion of the rendering instructions with the rendering instructions for displaying the selectable content associated with the help intent prediction.

10. The computer-implemented method of claim 1, further comprising:
    applying the help intent machine learning model to the one or more navigation events and the additional digital streaming system features to generate additional help intent predictions;
    generating additional rendering instructions for displaying selectable content associated with the additional help intent predictions; and
    replacing additional portions of the rendering instructions with the additional rendering instructions.

11. A system comprising:
    at least one physical processor; and
    physical memory comprising computer-executable instructions that, when executed by the at least one physical processor, cause the at least one physical processor to perform acts comprising:
    receiving a request for rendering instructions for rendering a help display of a digital streaming system on a client device of a digital streaming system user;
    determining one or more navigation events associated with the digital streaming system over a previous predetermined amount of time;
    determining additional digital streaming system features associated with the digital streaming system user;
    applying a help intent machine learning model to the one or more navigation events and the additional digital streaming system features to generate a help intent prediction;
    replacing at least one portion of the rendering instructions with a portion of alternate rendering instructions based on the help intent prediction; and
    transmitting the rendering instructions including the portion of alternate rendering instructions to the client device for rendering on the client device.

12. The system of claim 11, wherein receiving the request for rendering instructions is via a digital streaming system application installed on the client device.

13. The system of claim 12, wherein the one or more navigation events associated with the digital streaming system comprise navigation events within the digital streaming system application.

14. The system of claim 13, wherein the previous predetermined amount of time is 24 hours.

15. The system of claim 11, wherein the additional digital streaming system features associated with the digital streaming system user comprise account features and streaming features.

16. The system of claim 15, wherein the account features comprise one or more of: a digital streaming system plan type associated with the digital streaming system user, a digital streaming system account age associated with the digital streaming system user, geographic information for a digital streaming system account associated with the digital streaming system user, or historical information indicated by the digital streaming system account associated with the digital streaming system user.

17. The system of claim 15, wherein the streaming features comprise one or more of: an amount of streaming time associated with a digital streaming system account of the digital streaming system user, a streaming frequency associated with the digital streaming system account of the digital streaming system user, a number of profiles associated with the digital streaming system account of the digital streaming system user, or a streaming history associated with the digital streaming system account of the digital streaming system user.

18. The system of claim 11, further comprising computer-executable instructions that, when executed by the at least one physical processor, cause the at least one physical processor to generate rendering instructions for displaying selectable content associated with the help intent prediction.

19. The system of claim 18, wherein replacing the at least one portion of the rendering instructions with the portion of alternate rendering instructions based on the help intent prediction comprises replacing the at least one portion of the rendering instructions with the rendering instructions for displaying the selectable content associated with the help intent prediction.

20. A non-transitory computer-readable medium comprising one or more computer-executable instructions that, when executed by at least one processor of a computing device, cause the computing device to:

receive a request for rendering instructions for rendering a help display of a digital streaming system on a client device of a digital streaming system user;

determine one or more navigation events associated with the digital streaming system over a previous predetermined amount of time;

determine additional digital streaming system features associated with the digital streaming system user;

apply a help intent machine learning model to the one or more navigation events and the additional digital streaming system features to generate a help intent prediction;

replace at least one portion of the rendering instructions with a portion of alternate rendering instructions based on the help intent prediction; and transmit the rendering instructions including the portion of alternate rendering instructions to the client device for rendering on the client device.

* * * * *